Jan. 22, 1946.  L. H. SCOTT  2,393,344
DRIVE COUPLING MECHANISM
Filed June 11, 1942  6 Sheets-Sheet 1
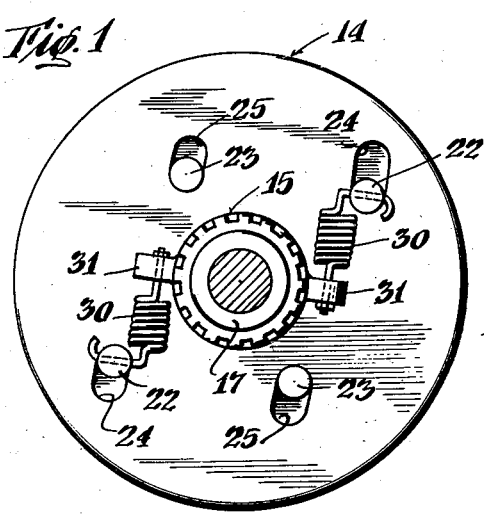
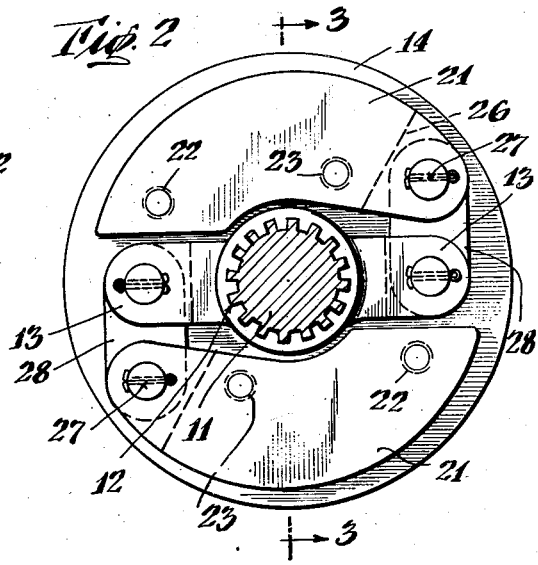
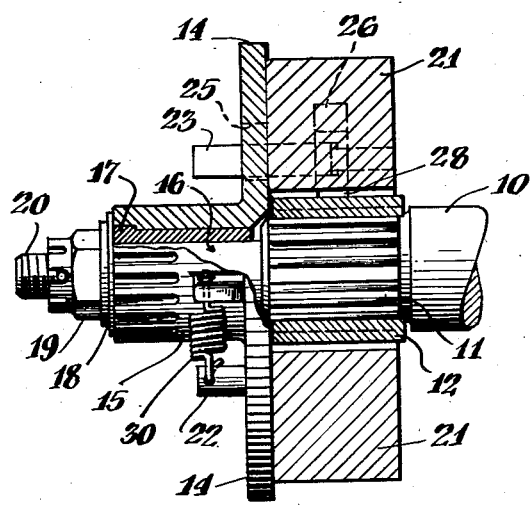
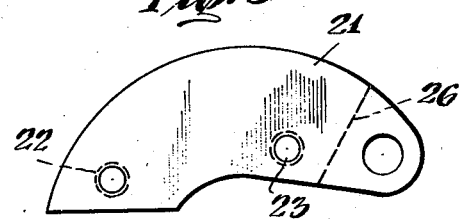
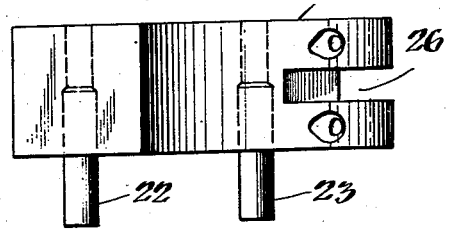
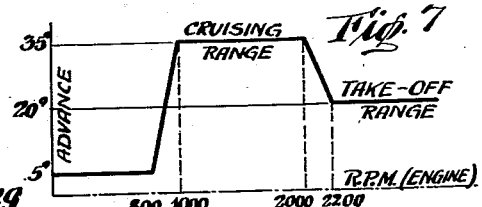
INVENTOR
Lloyd H. Scott
BY
Watson, Bristol, Johnson & Leavenworth
ATTORNEYS

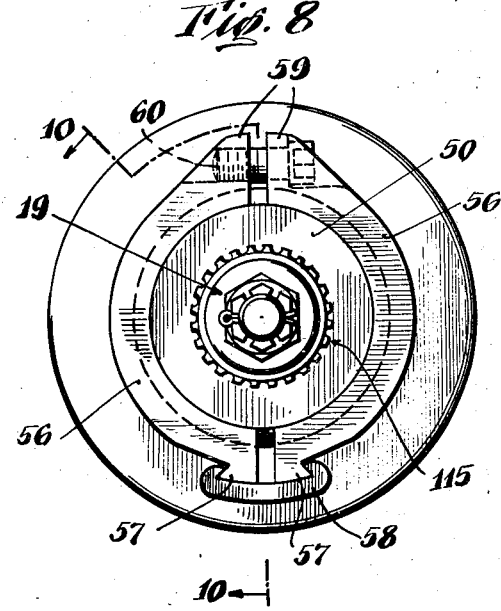
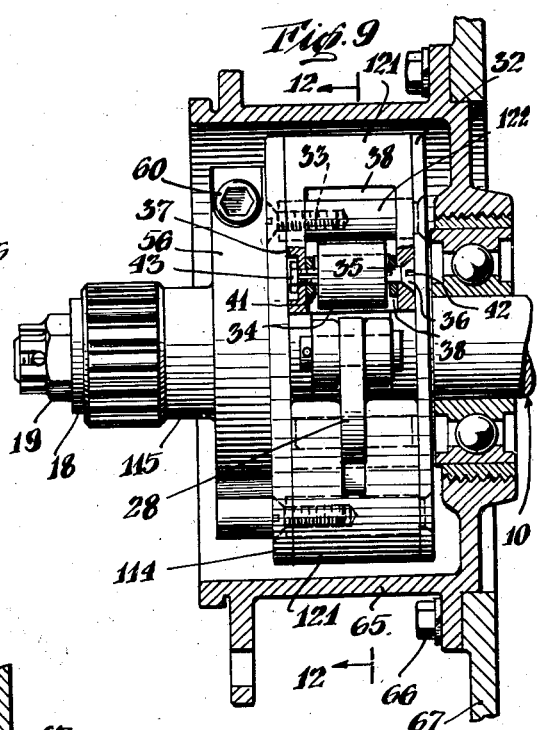
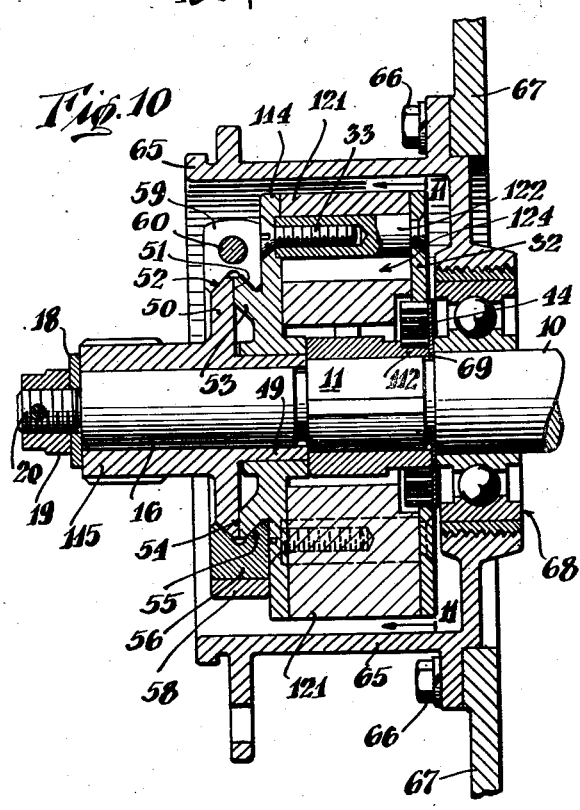
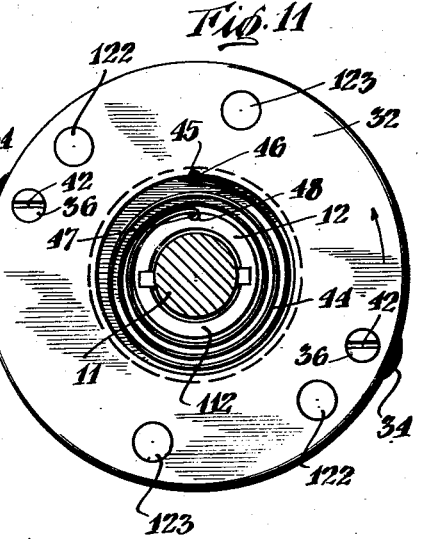

INVENTOR.
Lloyd H. Scott
BY
Watson, Bristol, Johnson + Leavenworth
ATTORNEYS

Jan. 22, 1946.                L. H. SCOTT                2,393,344
                     DRIVE COUPLING MECHANISM
                     Filed June 11, 1942           6 Sheets-Sheet 4
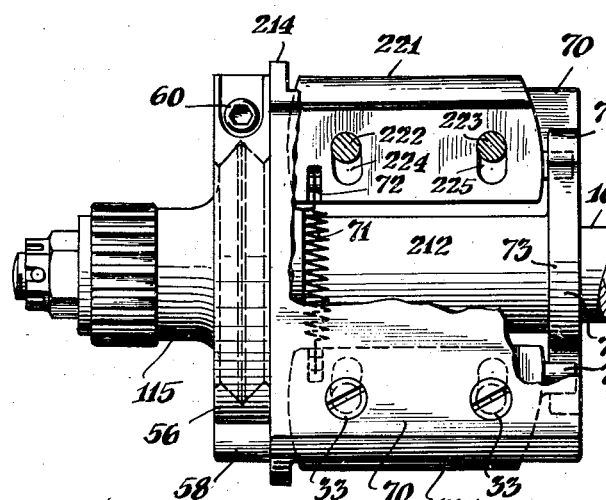
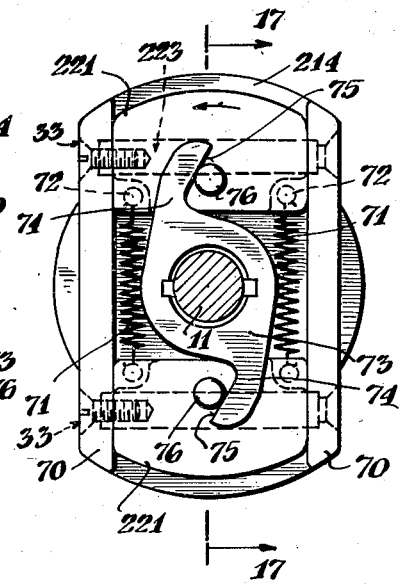
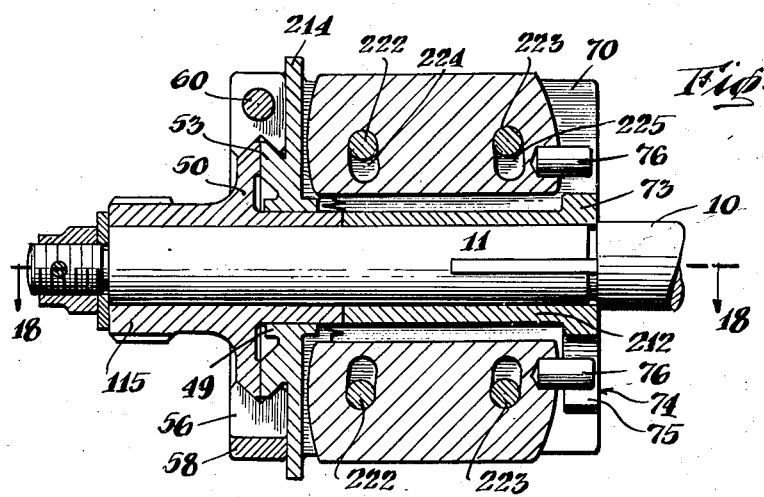
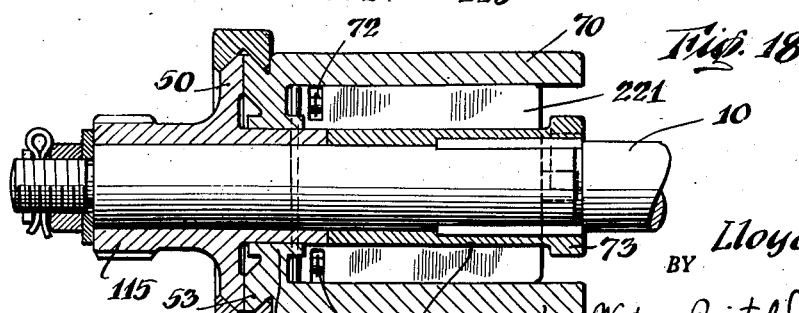
INVENTOR.
Lloyd H. Scott
BY
Watson, Bristol, Johnson & Leavenworth
ATTORNEYS Jan. 22, 1946.  L. H. SCOTT  2,393,344
DRIVE COUPLING MECHANISM
Filed June 11, 1942  6 Sheets-Sheet 5
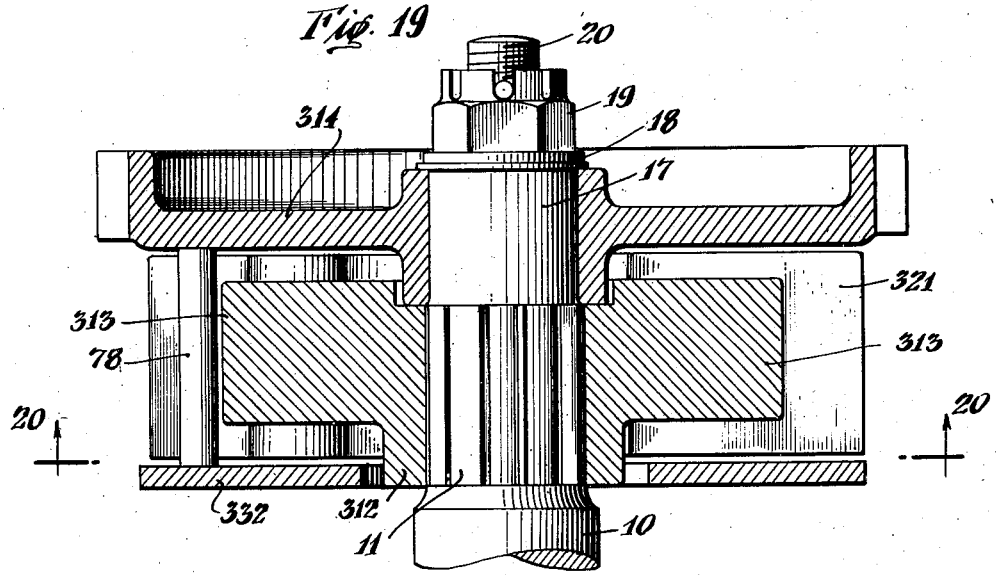
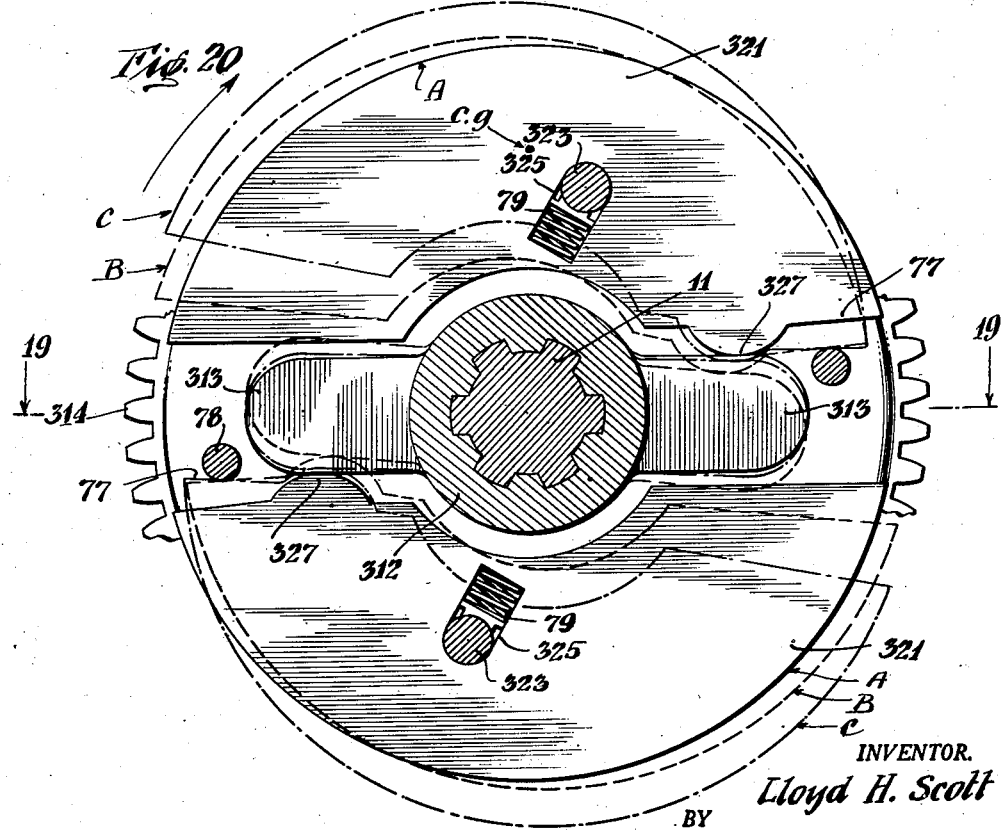
INVENTOR.
Lloyd H. Scott
BY
Watson, Bristol, Johnson & Leavenworth
ATTORNEYS Jan. 22, 1946.   L. H. SCOTT   2,393,344
DRIVE COUPLING MECHANISM
Filed June 11, 1942   6 Sheets—Sheet 6
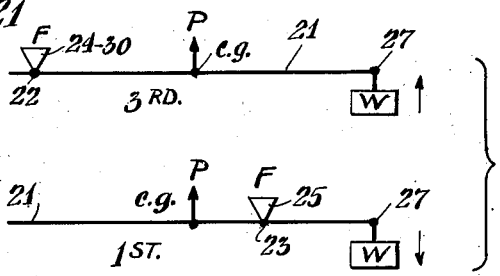
3RD TO 1ST CLASSES OF LEVERAGE
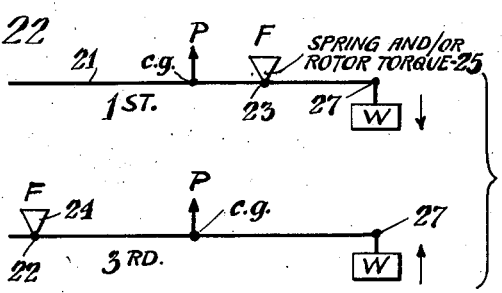
1ST TO 3RD CLASSES OF LEVERAGE
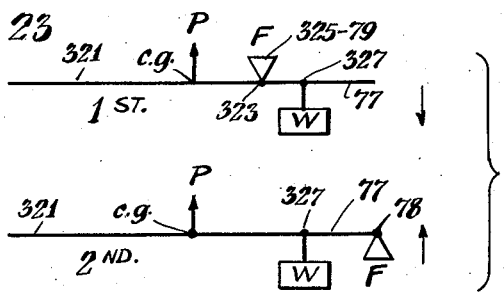
1ST TO 2ND CLASSES OF LEVERAGE
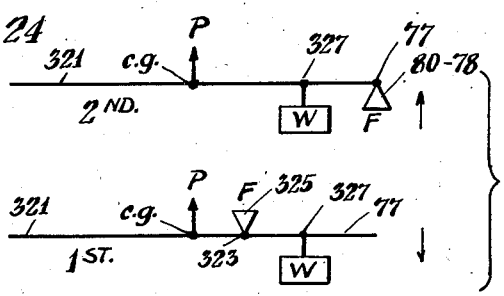
2ND TO 1ST CLASSES OF LEVERAGE
INVENTOR.
Lloyd H. Scott
BY
Watson, Bristol, Johnson & Leavenworth
ATTORNEYS Patented Jan. 22, 1946

2,393,344

UNITED STATES PATENT OFFICE 2,393,344

DRIVE COUPLING MECHANISM

Lloyd H. Scott, Garden City, N. Y., assignor to Eisemann Corporation, Brooklyn, N. Y., a corporation of Delaware Application June 11, 1942, Serial No. 446,579

16 Claims. (Cl. 64—25)

The present invention relates to angular phase shifting drive coupling mechanism particularly adapted for automatically effecting in a predetermined manner certain different angular shiftings of driven and driving elements with respect to each other; and the present application is a continuation-in-part of my copending application Serial No. 417,751, filed November 4, 1941.

A general object of the invention is the provision of such a device which is of simple and rugged construction readily adapted to economical commercial production, is efficient and positive in operation and capable in a ready manner of effecting between driving and driven elements a great variety of angular phase changes comprising angular shiftings in opposite directions, and is adapted for many uses including easy interpositioning between the driven rotor of a magneto or distributor in the ignition system of an internal combustion engine and an engine-operated driving shaft for selectively timing the spark.

A more specific object of the invention is the provision of such a device characterized by a driving element and a driven element associated with means to effect different phase relations between those elements and drive one from the other in such relative positions, such means comprising a centrifugal lever member floatingly mounted at a plurality of different places and cooperating with means for automatically causing the lever member to be fulcrumed selectively and alternately at such places at different speeds angularly to advance and retard one element relative to the other.

Another object is to provide a mechanism of the character indicated which is operated centrifugally and is provided with a centrifugal lever member and a plurality of fulcrums automatically coming into operation at desired instants and so arranged relative to a work locale as to cause said lever member alternately to act as a lever of the first class and a lever of one of the other two classes, i. e. second and third classes, to change the angular relationship between driving and driven elements for a given speed range.

A further object of the invention is the provision of such a mechanism which may be utilized effectively to advance and retard the spark timing for an internal combustion engine in a predetermined manner or in accordance with a predetermined characteristic curve.

An additional object of the invention is to provide a unitary mechanism of the character indicated which will automatically advance and retard the spark timing over a plurality of speed ranges such as may be desired in the field of aviation.

Still another object of the invention is to provide a mechanism of the character indicated as a small, compact, light weight unit that may be easily attached to standard equipment in an ignition system, such as to a magneto for airplane service, whereby the desired characteristic performance is made attainable.

A still further object is the provision of such a device wherein fulcrumed weights of a weight system are dynamically balanced, and weight biasing means are so related to the other parts that should such biasing means fail in an ignition service the device will operate in a manner to avoid serious engine operating difficulties.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawings, in which:

Fig. 1 is an end elevational view of one modification of the mechanism of the present invention;

Fig. 2 is an elevational view from the opposite end of the unit shown in Fig. 1 showing in section one of the driven and driving shafts connected thereto;

Fig. 3 is a sectional view taken on line 3—3 of Fig. 2;

Figs. 4, 5 and 6 are detailed views showing plans of elements of the assembly shown in Figs. 1, 2 and 3;

Fig. 7 is a diagrammatic view showing a three range angular advance-speed characteristic curve indicating automatically achieved changes by mechanism of the present invention in connection with its use as associated with the ignition system of an airplane;

Fig. 8 is an end elevational view of another modification of the mechanism of the present invention;

Fig. 9 is a side elevational view with parts broken away of the structure shown in Fig. 8, and as located in a suitable casing structure shown in elevational section;

Fig. 10 is a sectional view taken on line 10—10 of Fig. 8, with a sectional view of the casing structure shown in Fig. 9;

Fig. 11 is a sectional view taken on line 11—11 of Fig. 10;

Fig. 15 is a side elevational view with parts broken away of a further modification of the present invention;

Fig. 16 is an end elevational view of the structure shown in Fig. 15;

Fig. 17 is a sectional view taken on line 17—17 of Fig. 16;

Fig. 18 is a sectional view taken on line 18—18 of Fig. 17;

Fig. 19 is a sectional view taken along the axis of a further modification of the coupling device of the present invention, the line of sectioning being indicated in Fig. 20;

Fig. 20 is a sectional view taken along line 20—20 of Fig. 19; and

Figure 12:
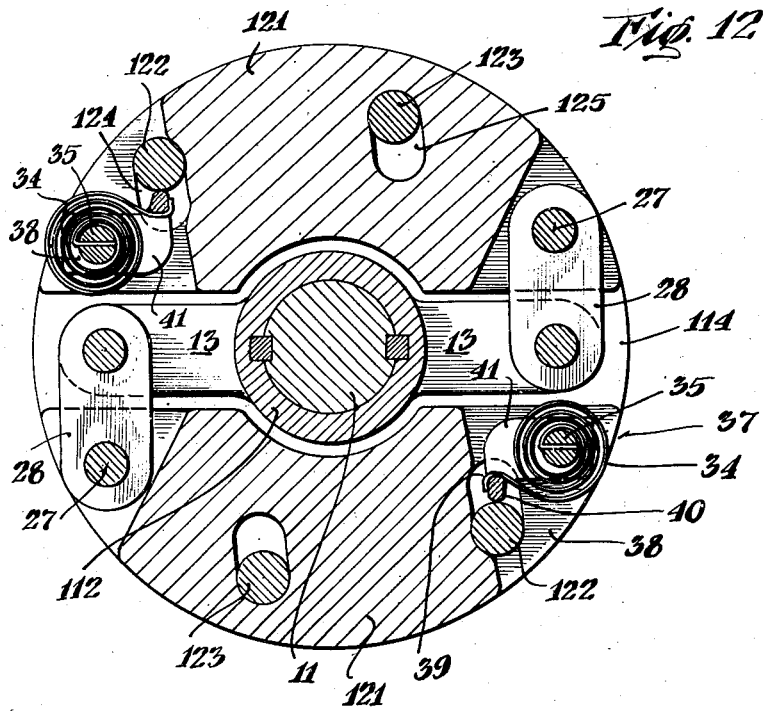
Fig. 12 is a sectional view taken on line 12—12 of Fig. 9, with the omission of the casing structure.

Figs. 21 to 24, inclusive, are diagrammatic showings of the four possible leverages of the present invention whereby advance and retard or angular shiftings in opposite directions of coupling elements relative to each other may be attained.

In many fields wherein a driven element is coupled to a driving element for rotation of one by the other it may be desired during rotary operation angularly to shift one relative to the other in opposite directions in accordance with a predetermined plan of operation; or to accomplish differing angular phase shifting, comprising advancing and retarding, in different speed ranges. The present invention is admirably suited to such purposes and to accomplish such ends automatically, the speed of the rotating members in a particular mechanical assembly inclusive of the device of the present invention being the chief governing factor in the selective operation of the latter. By way of example, the present invention may be of advantageous use in the field of aviation ignition.

It is generally desirable when airplane engines are starting or turning over at very slow rates of speed to cause the spark to occur at a small degree of advance before top dead center of a piston head is reached. Such advance is preferably constant from zero engine speed up to a certain engine speed substantially above maximum idling speed. In order to obtain maximum engine horse-power at full throttle condition such as desired on take-off the advance must be increased to a certain setting. Under cruising conditions where maximum engine horse-power is not required a higher fuel economy may be attained by a further increase in the spark timing advance over that required for maximum horse-power.

A speed angular-displacement characteristic which may be attained with the use of a particular modification of the invention and may be desired for certain airplane service is shown in Fig. 7, by way of example, as a three-range curve. Such curve has an initial portion showing speed ranging up to say about 800 R. P. M. in which the angular advance for the spark is to be constant and have a value of about 5°. This covers the cranking speed range of about from 10 to 50 R. P. M. and idling speed range of about from 300 to 800 R. P. M. From this value the advance is to be shifted to a maximum of about 35° at say 1,000 R. P. M. suitable for warm-up. This increased advance value obtains until the speed is about 2,000 R. P. M. when a retardation of the spark is to begin to take place. This latter continues until the advance is about 20° at a speed of about 2,200 R. P. M. and thereabove suitable for take-off during which maximum horse-power is demanded requiring the use of a relatively rich fuel mixture. The characteristic curve just described depicts the manner of spark control which may be desired in a magneto for a modern airplane engine. Many of such engines have cruising speeds of 1,000 and 2,000 R. P. M., say about 1,700 to 2,000 R. P. M., with the use of a relatively lean fuel mixture which latter requires a greater spark advance than when richer fuel mixtures are used. This explains the reason for the advance of the spark to about 35° at the intermediate speed range, that is during cruising; and is suitable though not essential for warm-up and does not introduce operating difficulties even though the advance has to go through that increase to 35° and then decrease to 20° between the starting and take-off.

The present invention provides a device employing centrifugally operated mechanism which automatically responds to a plurality of such speed ranges characterized by a driving element, a driven element, a centrifugal lever member mechanically interposed between the coupling elements and comprising a mechanism rotationally driving one of the coupling elements from the other, means at a plurality of different places floatingly mounting the lever member relative to one of the coupling elements, and means automatically causing the mounting means during rotary movement of the coupling elements selectively and alternately to act as fulcrums with the lever member acting at different speeds as a lever of the first class and a lever of another class to advance and retard the angular relationship between the coupling elements. In accordance with the present invention, the fulcra, the center of mass of the lever member and the effective point of driving connection between the lever member and one of the coupling members lie on different, angularly-related radii extending from a point on the axis of rotation of one of the coupling elements. The radius on which one of said fulcra lies is disposed within an angle between the radii on which the center of mass and the point of driving connection lie. The other fulcra radius is disposed outside the above mentioned angle between the center of mass radius and the point of driving connection radius.

The device of the present invention may have but one weight system and hence may be relatively light and of simple construction. It may be built as a detachable unit readily mountable in the drive of a magneto or distributor of the ignition system of an airplane engine. Thus the invention is adapted to association with the operating shaft of a magneto, suitable for airplane service, which may be of the type disclosed in my copending application Serial No. 374,324, filed January 14, 1941.

Referring to the drawings by way of example, like numerals refer to like parts throughout. A rotatably mounted shaft 10 may be that of a unit of an ignition system such as a magneto of the type indicated above and an angular phase shifting drive coupling mechanism is provided for the shaft 10. For this purpose the shaft 10 has a reduced portion 11 which may be splined, provided with gear teeth, or otherwise shaped for receiving driving force or torque.

An engaging member or sleeve 12 internally shaped complementary to the portion 11 of the shaft 10 may comprise the driven element of the coupling mechanism. Sleeve 12 may have one or more integrally attached arms 13, 13 through which the driving force is transmitted by any suitable means operatively associated or connected thereto. One such suitable means may comprise a linkage hereinafter described which operates to effect a desired phase shift or angular adjustment of the shaft 10 relative to another member such as the driving element here shown as comprising a member or plate 14 provided with a driving sleeve 15 rotatably disposed on a reduced portion 16 of shaft 10 preferably by means of an interposed bearing sleeve 17 and held thereon by a thrust washer 18 and a nut 19 threaded on a further reduced portion 20 of shaft 10. One or more members responsive to speed and arranged to control the angular phase shift in a manner corresponding with a desired speed angular-displacement characteristic in accordance with the invention are floatingly associated with member or plate 14.

The speed responsive member or members which, by way of example, are shown floatingly associated with respect to one of the coupling elements comprise one or more centrifugal weight or lever members 21, 21, preferably two in number, symmetrically arranged with respect to each other so that the mechanism may readily be balanced dynamically. Each of the weight members 21, 21 is shown floatingly mounted at a plurality of different places with respect to the driving coupling member 14. This may be accomplished by means of pins 22 and 23 which respectively work in ways such as slots 24 and 25 in the member 14. The sides of the slot 25 are defined by circular arcs circumscribed about the center of pin 22 in its innermost position and the sides of slot 24 are defined by circular arcs circumscribed about the center of pin 23 when in its outermost position in slot 25. The weight members 21, 21 are seen to be subject to centrifugal forces when the coupling mechanism revolves, the pins 22, 22 and 23, 23 serving as floating fulcrums at two different places.

Each weight member 21 is bifurcated at the end remote from the first fulcrum pin 22, as shown at 26, in order to embrace and be pivotally attached at a work locale or point 27 to one end of a link 28 which has its other end pivotally attached to the arm 13. Arm 13 is preferably bifurcated at 29 as shown in Fig. 4 in order to receive the end of link 28 and to equalize the pull thereof. In this modification it will be noted that the work locale or point 27 is to one side of both fulcruming places.

In order to impart selectivity in operation of the floating fulcrums each centrifugal lever member 21 is biased by a suitable biasing force at such places. For example, this may be accomplished by suitable springs between certain fulcrum pins and the member 14. The structure shown in Figs. 1 to 6, inclusive, will operate effectively when pins 22, 22 are alone biased by springs 30, 30 each of which is shown attached to an outside end of one of the pins 22 and anchored to a wing 31 on sleeve 15. In such a case reactive torque of the driven element or device attached thereto, such as a magneto rotor, provides the biasing through shaft 10, sleeve 12, arms 13, 13 and links 28, 28 for the pins 23, 23. The biasing due either to force exerted by a driven device or to such springs are so related in strengths to the mass of the centrifugal lever members as to hold the fulcrum pins stationary against centrifugal force and then permit selective movement thereof and have them alternately serve as fulcrums through predetermined speed ranges. If desired, however, springs may be used also for pins 23, 23 to increase the biasing thereof or the biasing due to reactive torque of the driven device or magneto rotor may be reduced by the use of resilient means between the driving and driven elements as is more fully pointed out hereinafter.

In a structure as depicted in Figs. 1 to 6, inclusive, the biasing force due to the springs 30, 30 attached to pins 22, 22 may be made the shorter and may have a strength such as to yield only to the value of the centrifugal force acting on the weight arm at about 2,000 R. P. M. and to be yielded fully through its operative range at about 2,200 R. P. M. and thereabove. The biasing force effective at the fulcrum pins 23, 23 at least in part due to reactive torque of the magneto rotor may be relatively weaker such as to be overcome by the centrifugal force of the weight arm obtaining at about 800 R. P. M. and the centrifugal weight members 21, 21 attains fully yielded positions at pins 23, 23 through their operative ranges at say about 1,000 R. P. M. and thereabove. Thus the centrifugal weight levers 21, 21 are so biased as to act as levers to do work or pull through links 28, 28, acting first as levers of the third class and then as levers of the first class whereby angular phase adjustments are made satisfying a three-range characteristic curve as depicted in Fig. 7. When the engine is revolving slowly or at a speed less than 800 R. P. M. the biasing forces cause the fulcrum pins 22, 22 and 23, 23 to be held to innermost initial positions as shown in Fig. 2. Under such conditions the angular advance of the spark timing due to angular advancement of the magneto rotor and breaker and distributor elements carried thereby or otherwise driven therefrom is but 5°, i. e. the spark from the magneto is occurring in its most retarded position. As the speed increases above about 800 R. P. M. the centrifugal force operating on the weight arm overcomes the biasing force which may at least be partially due to reactive torque of the magneto rotor with the slots 25, 25 permitting outward movement of the pins 23, 23 to their outermost positions. During such movement pins 22, 22 in their innermost positions serve as fulcrums and the weights 21, 21 move as levers of the third class pulling upon links 28, 28 which rotate arms 13, 13 in a counter-clockwise direction as viewed in Fig. 2 imparting an angular phase shifting to shaft 10 through sleeve 12 until at a speed of about 1,000 R. P. M. an angular advance of about 35° is had. This angular advance obtains for the second speed range up to about 2,000 R. P. M. with the links 28, 28 pulling on arms 13, 13 to rotate the member 12 and magneto rotor therewith as the centrifugal lever members act as levers of the third class. At about 2,000 R. P. M. the centrifugal force has increased to a value such that it begins to overcome the biasing force due to springs 30, 30 which latter then begin to yield. Fulcrum pins 23, 23 are now in the outermost parts of slots 25, 25 and here act as fulcrums while weights 21, 21 pivot about the same under the action of increased centrifugal force with slots 24, 24 permitting outward movement of pins 22, 22.

The device or magneto rotor being driven by the coupling imposes a drag on the links 28, 28 which is opposed by the biasing force of springs 30, 30 at pins 22. When the force due to this rotor torque and the centrifugal force acting at the center of gravity (c. g.) of each of the centrifugal lever members 21, 21 together reach a value which overbalances the biasing force of springs 30, 30 the pins 22, 22 are caused to move outwardly in slots 24, 24 to outermost parts of the latter where the outward parts of those slots then act as stops with the pins 22, 22 in outermost positions. During this operation the coupling member 12, arms 13, 13 and links 28, 28 are permitted to lag in a reverse or clockwise direction as viewed in Fig. 2, to a retard position thus retarding the angular advance of the distributor from about 35° to 20°. Thereafter the centrifugal lever members 21, 21 act as levers of the first class with pins 22, 22 acting as fulcrums in their outermost positions to transmit power from the driving coupling member 14 to the driven coupling member 12 through pulling linkage 28, 28, and this advance of about 20° which is attained at a speed of about 2,200 R. P. M. obtains for speeds above the latter value.

The longitudinal dimensions of the slots 24, 24 and 25, 25 determine the outward travel of the centrifugal lever members thereat and thus also the degree of changes of the angular advance and retard. The outermost part of the arcuate way or slot 25 constitutes a fulcruming abutment for pin 23 shown in Figs. 1 and 2 in a fulcrum floating position (which in this modification is a low speed driving position) and the innermost part of the arcuate way or slot 24 constitutes a fulcruming abutment for pin 22 with the outermost part of the latter slot constituting a stop for pin 22. The terms "inward," "outward," "innermost" and "outermost" as used herein refer to radial directions as distinguished from axial directions.

It will be noted that should the springs break or become unduly weakened due to strain in service the dynamically balanced weights will assume their outermost positions during flight giving a spark advance of about 20° which is a safe operating value thereby avoiding engine failure and consequent disaster. The importance of this safety feature will readily be understood.

As described the structure shown in Figs. 1 to 6, inclusive, permits operation of the lever members first as levers of the third class fulcruming around pins 22, 22 and then as levers of the first class fulcruming around pins 23, 23. This operation can be reversed so that the lever members first operate as levers of the first class and then as levers of the third class. The latter may be accomplished by using biasing springs for the pins 23, 23 and more weakly biasing the pins 22, 22 such as by weaker springs or alone by reactive torque of the driven device.

A variety of angular advance and retard phase shifting between the driving and driven elements of a drive coupling mechanism may be obtained by proper design of the parts, selection of and relationship between fulcrum points and the point at which work is accomplished by the lever members in addition to a provision of different types of biasing of certain strengths at selected fulcrum points. It is also believed to be obvious that such a device will operate in a desired manner with a reversal of the driving and driven elements, for example, the shaft which is operatively associated with a lever member, such as by yoke 12, arm 13 and link 28, may constitute the driving element and the member 14 to which the lever member is floatingly mounted may constitute the driven element.

Selective automatic advance and retard of a driven coupling element or member relative to a driving coupling element or member can also be had by a device wherein mechanism mechanically interposed between the driving member and the driven member of the coupling for rotationally driving the latter from the former comprises a centrifugal lever member floatingly mounted at different places relative to one of the coupling members selectively and alternately to operate as a lever of the first class and a lever of the second class. Depending upon which of the two coupling members is to constitute the driving element and the direction of rotation of the coupling device first advance and then retard of the angular relationship between the coupling members or vice versa can be had as predeterminately desired, of course with suitable provision for biasing at floating mounts as a particular case may demand. Thus the centrifugal lever member may act first as a lever of the first class and then as a lever of the second class, or first as a lever of the second class and then as a lever of the first class. Structure capable of such performance will, by way of example, be hereinafter described.

Characteristic curves having, for example, four ranges may be attained by providing the weight system with still another set of floating fulcrums suitably related to the other fulcrums and the mechanical driving connection or operative driving association of the weight system with one of the coupling elements and suitable biasing whereby the fourth range of adjustment is obtained at another speed. Any and all such characteristic operations will be featured by angular advance and retard with the centrifugal lever member operating at times as a lever of the first class and at other times as a lever of another or other classes, i. e. second class and/or third class.

Obviously the pivot or fulcrum pins 22, 22 and 23, 23 may be fixedly carried by the coupling member 14 and be received in suitable arcuate slots in the centrifugal weight members 21, 21 with suitable provision of biasing of the pins in the slots. For this purpose resilient means such as springs may bias certain or all of the pins in such slots to inward positions. Such springs may be spiral compression springs positioned in such slots between the pins and the outermost ends of the slots, or tension springs each having one end connected to a pivot pin and the other end connected to some portion of the weight member inward of the arcuate slot therefor. Of course the biasing of the pins either by a spring at one pin and reactive torque of a driven device at the other pin or by springs at both pins with the biasing force of one supplemented by the biasing force due to reactive torque of the driven device must be adapted selectively to be overcome by centrifugal force values as in the previously described construction to obtain similar action. Any and all structure that individually or collectively biases the lever member to inward positions at the fulcrums is referred to herein as "biasing means."

Such a modified structure as suggested immediately above is shown by way of example in Figs. 8 to 12, inclusive. As in the first modification coupling member or sleeve 112 is secured on a portion 11 of the shaft 10 such as by splining and carries a pair of arms 13, 13 which are linked by a pair of links 28, 28 to a pair of centrifugal lever members 121, 121. Each of said centrifugal lever members 121, 121 is floatingly associated with a second coupling member 114 by a pair of fulcrum pins 122 and 123 fixed to an end plate 32 and internally bored and threaded to anchor stud bolts 33—33 extending through the coupling member 114. The fulcrum pins 122 and 123 thus suitably space the end plate 32 from the coupling member 114 and fix it thereto for operative location therebetween of the centrifugal lever members 121, 121 each of which is provided with a pair of arcuate slots 124 and 125 respectively receiving the fulcrum pins 122 and 123.

The reactive torque of the driven device inclusive of the magneto rotor is relied upon for biasing the centrifugal lever members 121, 121 at the fulcrum pins 123, 123 and suitable spring devices are used for biasing at the fulcrum pins 122, 122. The latter may each comprise a spiral spring 34 having the inner end thereof seated in a slot in the shank 35 of a conically headed or machine bolt 36 which traverses an end 37 of the centrifugal weight member 121 bifurcated at 38 for reception of the spring and associated structure. The other end 39 of the spiral spring 34 is hook-shaped to be received beneath the transverse bar 40 extending between side arms 41, 41 of a U-shaped clip member loosely mounted upon the bolt shank 35 with the transverse bar 40 riding against the fulcrum pin 122 to bias it in the outermost part of slot 124. Adjustment of the biasing force can be had by the provision of a screw-driver slot 42 in the head of the bolt 36 and a lock nut 43 on the threaded shank 35 thereof. When the structure is assembled suitable tension is applied to the spiral spring 34 by rotating the bolt 36 with a screw-driver and locking it in desired position by the lock nut 43. With the parts in the relative positions shown in Fig. 12 pin 123 is in a fulcrum floating position in the outermost part of slot 125 with the innermost part of the latter constituting a fulcruming abutment for that pin, and pin 122 is in a fulcruming position in the outermost part of slot 124 with the innermost part of the latter constituting a stop for pin 122.

The effective force on the centrifugal lever members 121, 121 at the fulcrum pins 123, 123 due to reactive torque of the driven device may be reduced to a predetermined value by the use of a resilient member or spring between the driving and driven elements such as a spiral spring 44 wrapped around the axis of rotation and placed under stress with one end 45 fastened to the end plate 32 such as by reception in a slot 46 and with the inner end 47 of the spring suitably anchored to the coupling element 112 such as by mounting in a slot 48 therein.

Coupling member 114 may if desired be suitably associated with a suitable timing coupling mechanism for manual setting of the timing at the time the magneto and coupling mechanisms are mounted upon the engine. Such structure may comprise a sleeve 115 rotatably mounted on the reduced portion 16 of the shaft 10 and held thereon by the thrust washer 18 and nut 19. Sleeve 115 is suitably splined as shown for connection to a driving member suitably operated, such as by the engine, and the inner end 49 thereof rotatably supports the coupling member 114. The driving sleeve 115 is provided with a flange 50 having a friction face 51 substantially lying in a flat plane and a conical face 52. A flange 53 on the coupling member 114 is also provided with a friction face 54 substantially lying in a flat plane for cooperation with the face 51 and a conical face 55 similar to the conical face 52. Thus relative rotation between coupling member 114 and driving sleeve 115 is permitted for mechanical timing except when the two flanges 50 and 53 are securely clamped together for rotation one from the other. This clamping may be obtained by a pair of half shoes 56, 56 each having a V-shaped groove on the inner side thereof, as shown in Fig. 10, to cooperate with the conical faces 52 and 55 to clamp flanges 50 and 53 together in frictional engagement for rotation one from the other. The half shoes 56, 56 may be suitably secured together such as by pivoting but preferably each is provided with a lug 57 over which is hooked a heel piece or link 58. Opposite ends of the half shoes 56, 56 are provided with upstanding pierced ears 59, 59 through one of which is extended a stud bolt 60 threadably engaged into the other for adjustably clamping the half shoes 56, 56 on flanges 50, 53.

Figure 13:
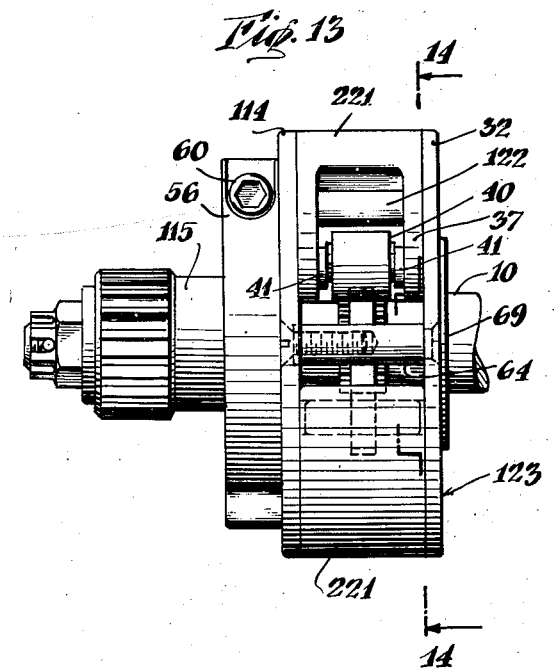
Fig. 13 is a side elevational view of a further modification of the mechanism of the present invention.
Figure 14:
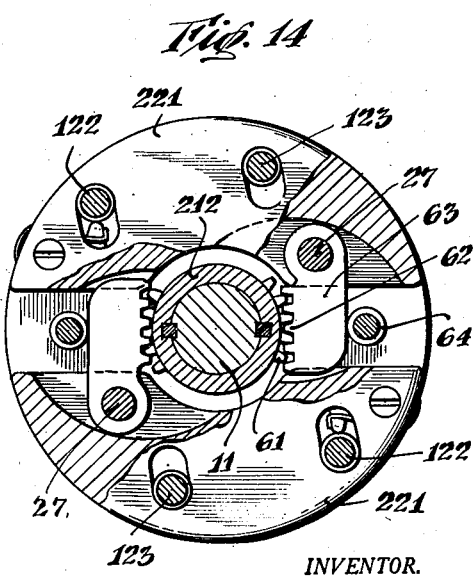
Fig. 14 is a sectional view taken on line 14—14 of Fig. 13, with parts broken away.

It will be understood that the operative driving association of the centrifugal lever members with one of the coupling members is not limited to the use of a linkage, as is best illustrated in Figs. 13 and 14. For example, a rack and pinion device may be used with a coupling member or sleeve 212 suitably splined on the portion 11 of shaft 10 and provided with pinion teeth 61 engaged by rack teeth 62 on a rack 63 pivotally mounted such as at 27 to one of two centrifugal lever members 221, 221. A guide pin 64 similar in structure to fulcrum pins 122 and 123 and mounted similarly between end plate 32 and coupling member 114 assures proper engagement between the pinion teeth 61 and rack teeth 62 at all times.

The linkage between the coupling sleeve mounted on the shaft 10 and the centrifugal lever members as shown in Figs. 1 to 12, inclusive, and the rack and pinion device shown in Figs. 13 and 14, are two examples of the many suitable ways that such elements may operatively be connected together or associated with each other for driving one from the other. For example, the operative driving association does not of necessity require direct connection since the desired operation may be attained by disconnected mechanism such as suitable cam means hereinafter exemplified, and the use of the term "operatively associated" as used herein and in the claims in connection with the transmission of power from a centrifugal lever member to a coupling element, or vice versa as the case may be, for rotation of one by the other is intended to include within its scope all such possible devices which will readily occur to one skilled in the art.

It will be noted that in the modifications described above the centrifugal lever members are arranged transversely of the axis of rotation of the coupling elements. This is preferred in that compactness and simplicity of construction are assured by such arrangements. However, it will readily be understood that the invention may be practiced with a disposition of such elongated centrifugal lever members substantially parallel to the axis of rotation of the coupling members with one or more centrifugal lever members being floatingly associated with one of the coupling members at a plurality of places for rotary movement therewith, and the provision of suitable means for automatically causing the lever members to be fulcrumed selectively and alternately at such places at different speeds, and operative driving association of the centrifugal lever members with the other coupling member for rotational driving of the latter by the former; whereby angular phase shifting of one coupling member with respect to the other may automatically be attained in different speed ranges with rotational driving of one of the coupling members from the other through the medium of such centrifugal lever members.

Such structure is shown by way of example in Figs. 15 to 18, inclusive. The coupling element or plate 214 rotatably mounted on the portion 16 of shaft 10 is provided with a pair of spaced apart longitudinally extending plates 70, 70 which may be made integral therewith or secured thereto in any suitable fashion, such as by screws or the like. The plates 70, 70 are rigidly held in spaced apart position by fulcrum pins 222, 222 and 223, 223 anchored in position by screws 33—33. A pair of centrifugal lever members 221, 221 are floatingly disposed between the plates 70, 70 with pins 222, 222 and 223, 223 respectively received in substantially radially outwardly extending arcuate slots 224, 224 and 225, 225 in the centrifugal lever members as shown. The opposed pair of centrifugal lever members 221, 221 are biased toward each other, that is to innermost positions, at fulcrum pins 222, 222 by a pair of springs 71, 71 having their opposed ends mounted on the centrifugal lever members by any suitable means such as pins 72—72 anchored to or in recesses in the centrifugal lever members. A sleeve 212 splined on to the portion 11 of shaft 10 carries a cam plate 73 which may be made integral therewith as shown. The cam plate 73 is provided with an opposed pair of substantially radially extending arms 74, 74 each of which has a cam surface 75 sloping away from the direction of rotation assuming a counterclockwise rotation of the structure when viewed from the driving side as shown in Fig. 16. Each centrifugal lever member 221 carries on the end thereof on the driving side a cam follower 76 such as a pin as shown which rides against the cam surface 75. In operation of the device shown in Figs. 15 to 18 incl., the centrifugal lever members 221, 221 are biased inwardly at the fulcrum pins 223, 223 by reactive torque of the rotor of the apparatus being driven such as a magneto rotor through the sleeve 212, cam arms 74, 74 and pins 76, 76, which are pulled to radially inward positions and held therein by virtue of the shape of the cam surfaces 75, 75 until such biasing force is overcome by centrifugal force acting on the lever members. In such positions the pins 223, 223 are in fulcrum floating positions and the pins 222, 222 are in fulcruming positions. When the biasing force due to rotor torque is overbalanced by centrifugal force in a certain speed range the centrifugal lever members 221, 221 are pivoted outwardly about fulcrum pins 222, 222 with the lever members biased to radially inward positions thereat by the springs 71, 71. This causes the pins 76, 76 to ride outwardly along the cam surfaces 75, 75 and angularly advance shaft 10 relative to the driving sleeve 115. As the speed increases to a higher range the centrifugal force acting on the lever members 221, 221 finally overbalances the biasing force of springs 71, 71 and the lever members are pivoted around fulcrum pins 223, 223 in fulcruming positions in the innermost parts of slots 225, 225 to move the cam pins 76, 76 radially inwardly a limited distance thereby permitting the angular advance of driven shaft 10 to be retarded to a certain extent.

It will be noted that the ends of the plates 70, 70 may overhang the cam plate 73 and its arms 74, 74 to limit rotary movement of the latter with respect to the former.

In Figs. 19 and 20 is shown a coupling structure featured by centrifugal lever members adapted alternately to act as levers of the first and second classes automatically to obtain advance and retard shifting of the angular relationship between driving and driven coupling members. By way of example the driving coupling element may comprise a spur gear 314 suitably journaled, such as by a sleeve 17, upon a portion of shaft 10 which has an intermediate splined portion 11 interfitted with a sleeve 312. Opposed cam arms 313, 313 are fixed to or carried by the sleeve 312 comprising the driven coupling member. As in previous modifications the shaft 10 is adapted to drive the rotor structure of the device, such as a magneto, to be driven through the coupling mechanism. An end plate 332 is suitably fixed to the gear 314 for rotation therewith by two pairs of pins 78, 323 and 78, 323 similarly if desired to the mounting of the end plate 32 by the pairs of fulcrum pins 122, 123 and 122, 123 in the modification shown in Figs. 8 to 12, incl. With the coupling mechanism viewed from the magneto side as in Fig. 20 and rotating in a clockwise direction as so viewed, it will be noted that each centrifugal lever member 321 is provided with a slot 325, a camming portion at 327 and an abutment nose 77, all to one side of the center of gravity (c. g.), which in the case of the uppermost centrifugal lever member are all to the right of the center of gravity and are located relative to each other in the order named. Initially the pin 323 is biased in the slot 325 to the outermost part thereof by a compression spring 79 and the camming portion bears against a surface of the arm 313 at 327 with the abutment nose 77 spaced from the pin 78. Accordingly the rotor torque biases the centrifugal lever member 321 through the camming structure to its initial position shown in full lines at A until a speed range is reached where the centrifugal force overbalances the biasing force due to the rotor torque. Thereafter the centrifugal lever member acts as a lever of the first class pivoting around the pin 323 as a fulcrum in a fulcruming position in the outermost part of the slot 325. This will cause the camming portion at 327 angularly to advance the cam arm 313 of the driven coupling member until the abutment nose 77 engages the pin 78 as a stop with the centrifugal lever member 321 in the position shown in dotted lines at B. This angular advance then obtains until a speed range is attained where the centrifugal force further increases sufficiently to overbalance the biasing force due to the compression spring 79 and thereafter the centrifugal lever member 321 will be fulcrumed about the pin 78 with the abutment nose 77 in engagement therewith and with the portion of the centrifugal lever member adjacent pin 323 moving outwardly until the compression spring 79 and the innermost part of the slot 325 cooperate to provide a stop for pin 323. This second action is accompanied by a retarding movement of the camming portion at 327 which permits an angular retarding of the cam arm 313 and the driven coupling member connected thereto, with the centrifugal lever member acting as a lever of the second class and moving to the position shown in dot-dash lines at C. It will thus be seen that a desired advance and retard, which may be similar to that diagrammed in Fig. 7, may be obtained with this structure wherein the centrifugal lever members act first as levers of the first class and then as levers of the second class.

Obviously, if in the structure shown in Figs. 19 and 20 the compression spring 79 in slot 325 be omitted and a similar spring positioned between the pin 78 and the abutment nose 77, each centrifugal lever member may be caused to operate first as a lever of the second class and then as a lever of the first class with the fulcruming at the abutment nose 77 being provided by the compression spring between abutment nose 77 and pin 78, which spring is indicated by the numeral 80 in the diagrammatic showing in Fig. 24. With such a structure rotating in the direction indicated in Fig. 20, that is clockwise when viewed from the rotor side of the coupling device, first a retard and then an advance action is obtained. Guidance for such a compression spring 80 may be provided by angularly widening the abutment nose 77 and providing it with an elongated slot receiving pin 78 in the far end thereof with the other parts disposed in the positions shown in full lines in Fig. 20. Such slot could extend toward and terminate in an abutment end in the neighborhood of the position shown for the abutment face of nose 77 and such spring 80 would be positioned in that slot between pin 78 and the abutment end of the slot to provide a resilient fulcruming abutment.

Obviously for the camming structure between the centrifugal lever member 321 and arm 313 shown in Figs. 19 and 20, a linkage which may be similar to that shown in Figs. 2 and 12, or a rack and pinion structure similar to that proposed in Figs. 13 and 14 may be substituted at the work locale 327. Such linkage may be a pushing rather than a pulling linkage, or vice versa, depending upon the direction of rotation of the device and as to which of the two coupling elements serves as the driving element with the other serving as the driven element. For example, if the centrifugal lever member 321 be linked to arm 313 such as by a link similar to link 28 at the work locale 327 and the gear 314 serve as the driving coupling element while rotating counterclockwise as viewed in Fig. 20, first advance and then retard may be had with a pulling linkage and with the centrifugal lever member first acting as a lever of the second class and then as a lever of the first class, as is diagrammed in Fig. 24. Proper biasing of the centrifugal lever member 321 to attain such operation may be provided at pins 323 and 78 by omitting spring 79 and utilizing a compression spring at 80 or providing a compression spring at 80 having a more effective biasing force than the spring utilized at 79, whereby floating action at pin 323 is obtained before such action is obtained at pin 78.

It will be noted from Fig. 7 that there is a definite slope to the curve between the substantially horizontal portions thereof. This represents the rate of change of angular shifting due to the rate at which the biasing is overcome by the centrifugal force. Obviously this can be altered as desired by proper design of parts and biasing means of any of the indicated modifications, for example by selection of biasing springs or structure constituting the biasing means having certain characteristics. By way of example, the portions of the curves between the horizontal portions can be made to assume substantially vertical positions or contrastingly can be flattened out considerably as desired. The general requirements regarding biasing of the centrifugal lever member at the fulcruming places as outlined above in connection with various modifications will be applicable and proper selection thereof for the attainment of particular operating characteristics will now be apparent to one skilled in the art.

In Figs. 21 to 24, incl., are diagrammatically indicated some of the various operative possibilities of the present invention and the structure of various modifications herein disclosed. In Fig. 21 is diagrammed structure similar to that shown in Fig. 2 wherein each of the centrifugal lever members may operate first as a lever of the third class and then as a lever of the first class in attaining an advance and retard of the angular relationship between driving and driven coupling members.

In Fig. 22 a similar structure is diagrammed wherein the centrifugal lever member 21 is more forcefully biased at fulcrum pin 23 than at fulcrum pin 22 so that it will act first as a lever of the first class and then as a lever of the third class. With a structure similar to that shown in Fig. 2 first an advance and then a retard could be had with such a leverage and biasing, if the coupling device is reversely rotated, that is in clockwise direction when viewed from the rotor side as there shown. In such case the linkage obviously would act as a pushing linkage.

In Fig. 23 is diagrammed the operation of the structure shown in Figs. 19 and 20, wherein the centrifugal weight member may act first as a lever of the first class and then as a lever of the second class to obtain first an advance and then a retard.

In Fig. 24 is diagrammed the operation of a structure proposed above in connection with Figs. 19 and 20, wherein it is suggested that a compression spring be interposed between the pin 78 at the abutment nose 77 with the omission of or use of a weaker compression spring 79 in the slot 325 so that the centrifugal lever member may act first as a lever of the second class and then as a lever of the first class.

The mechanism as shown may readily be encased by separate casing members or can readily be housed in a cup-shaped or flanged socket suitably mounted upon the structure of the driven or driving device. Such encasement may be obtained in the case of a magneto driven from an engine by providing a cup-shaped member upon the side of a magneto casing into which projects the driven shaft of the magneto, such cup-shaped member loosely receiving the mechanism of the present invention with provision for freedom of action of the coupling elements and centrifugal weight members. By way of example the mechanism depicted in Figs. 9 and 10 is shown suitably encased in a casing 65 suitably secured by screws 66—66 to a casing 67 of a magneto unit with the cup-shaped member 65, if desired, being provided with a bearing unit 68 supporting one end of the rotor shaft 10. A suitable thrust washer is shown at 69.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. An angular phase shifting drive coupling mechanism comprising, in combination, a driving element, driven element, a centrifugal weight member operatively connected to one of said coupling members at a particular work locale, a pair of fulcrum means floatingly connecting said weight member to the other of said coupling members at two different places, one of said places being in a zone between said work locale and the center of mass of said weight member and the other place being outside said zone, each of said fulcrum means permitting said weight member to move outwardly a limited distance when centrifugal force is applied thereto, means biasing said weight member to an innermost position at one of said fulcrum means, said weight member being adapted to be biased to an innermost position at the other of said fulcrum means by rotation resisting force of a driven device, and spring means connected between said elements reducing the effective biasing force of such driven device, said biasing means and the net biasing force being adapted to be overcome by different centrifugal force values to cause said fulcrum means alternately to act each as a pivot point for said weight member to effect different phase shifts of said elements with respect to each other at different speeds.

2. An angular phase shifting drive coupling mechanism comprising, in combination, a driving element, a driven element, an elongated centrifugal weight lever, means floatingly connecting said lever member to said driving element to provide a pair of members rotatable together with said lever member alternately operable at different speeds as a lever of the first class and a lever of another class, a link connected to said lever member, a crank arm fixed to said other element and pivoted to said link for rotational driving of that element by said lever member, said means comprising a fulcrum pin fixed on one side of said members floatingly received in an elongated outwardly extending way in the other member for limited outward movement of said lever member, another pin fixed on one of said members spaced from a fulcruming abutment on the other of said members to be brought into cooperating contact for action as a fulcrum when said lever member is pivoted about said first-mentioned pin in the way, means biasing said lever member to a fulcruming position at said first-mentioned pin with said lever member in a fulcrum floating position at said second-mentioned pin whereby said pins selectively and alternately act as fulcrums for said lever with the latter acting at different speeds as a lever of the first class and a lever of another class.

3. An angular phase shifting drive coupling mechanism comprising, in combination, a driving element, a driven element, an elongated centrifugal weight lever floatingly positioned transversely of the axis of one of said elements to form therewith two floatingly associated members, a pair of fulcrum means fixed at two different places on one of said two members with the other having arcuate ways floatingly receiving portions of said fulcrum means for limited outward movement of said lever member, a link pivoted at another place to said lever member to one side of said first-mentioned places, a crank arm fixed to said other element and pivoted to said link, and means biasing said lever member at said fulcrum means to initial innermost positions, the biasing force of said biasing means being adapted to be overcome by different centrifugal force values to cause said fulcrum means alternately to act each in its cooperating way as a pivot point for said lever member to effect different phase shifts of said elements with respect to each other at different speeds.

4. An angular phase shifting drive coupling mechanism comprising, in combination, a coupling member for transmitting rotation to a driven member, a second coupling member for transmitting rotation from a driving member to said first coupling member, one of said coupling members comprising a rotary plate, a second plate fixed to said first-mentioned plate in spaced apart relation thereto by a pair of angularly spaced fulcrum pins, a centrifugal elongated weighted lever member located transversely of the axis of rotation of said members and between said plates with arcuate ways therein floatingly receiving said fulcrum pins for limited outward movement of said lever member, means operatively associating said lever member with the other of said coupling members at a particular work locale to one side of said pair of fulcrum pins for rotational movement of that coupling member by said lever member to and in angularly shifted positions relative to said plate-bearing coupling member, and means biasing said lever member to an innermost position including spring means between said lever member and the fulcrum pin farthest from said work locale restraining outward movement of said lever member at that fulcrum pin, the biasing of said lever member at the fulcrum pin nearest the work locale being of less effective force value than that of said spring means whereby said lever member is adapted to operate at relatively lower speeds as a lever of the third class and at relatively higher speeds as a lever of the first class angularly to advance one of said coupling members relative to the other through a certain speed range and to retard it through a higher speed range.

5. An angular phase shifting drive coupling mechanism comprising, in combination, a coupling member for transmitting rotation to a driven member, a second coupling member for transmitting rotation from a driving member to said first coupling member, one of said coupling members comprising a rotary plate, a second plate fixed to said first-mentioned plate in spaced apart relation thereto by two pairs of angularly spaced fulcrum pins, a pair of centrifugal elongated weighted lever members diametrically opposed to each other to attain dynamic balance with each located transversely of the common axis of rotation of said members and between said plates with each centrifugal member having a pair of arcuate ways therein and with one way of a pair of the ways floatingly receiving one of a pair of said fulcrum pins and the other way of that pair floatingly receiving the other fulcrum pin of that pair for limited outward movement of each of said lever members, a pair of opposed crank arms fixed to the other of said coupling members, a pair of links with each pivoted at one end to one of said lever members at a particular work point to one side of the pair of fulcrum pins and the cooperating ways for that lever member and pivoted at its other end to one of said crank arms, a spring-biasing device mounted on each lever member adjacent the fulcrum pin farthest from said work point and bearing against that fulcrum pin to bias the lever member thereat to an innermost position with that fulcrum pin located in the outermost part of the associated way, the biasing of said lever member by said spring device being of more effective force value than that of the mechanism to be driven by the driven coupling member inclusive of reactive torque thereof whereby each of said lever members is adapted to operate at relatively lower speeds as a lever of the third class and at relatively higher speeds as a lever of the first class so that said lever members cooperatively angularly advance the driven coupling member relative to the driving coupling member and drive the former from the latter at a certain predetermined angular advancement through and in certain speed ranges and then angularly retard the former relative to the latter to a smaller angle of advancement through a higher speed range.

6. An angular phase shifting drive coupling mechanism comprising a rotatable drive element, a rotatable driven element, a centrifugal weight member having a center of mass, a driving connection including a link connecting one end of said weight member to one of said elements, a pair of shiftable fulcrum means supporting said weight member on said other element for relative inward and outward shifting and pivotal movement relative to the axis of rotation of said other element, one of said fulcrum means being positioned in a zone between said center of mass and said drive connection and the other outwardly of said zone, and means biasing said weight inwardly toward the axis of rotation of said other rotatable element.

7. An angular phase shifting drive coupling mechanism comprising a rotatable drive element, a rotatable driven element, a centrifugal weight member having a center of mass, a rack and pinion driving connection between said weight member and one of said elements, a pair of shiftable fulcrum means supporting said weight member on said other element for relative inward and outward shifting and pivotal movement relative to the axis of rotation of said other element, one of said fulcrum means being positioned in a zone between said center of mass and said drive connection and the other outwardly of said zone, and means biasing said weight inwardly toward the axis of rotation of said other rotatable element.

8. A drive coupling mechanism comprising a rotatable driving element, a rotatable driven element, a lever having a center of mass, a first means connecting said lever and one of said elements for inward and outward shifting and pivotal movement of said lever relatively to the axis of rotation of said one element, a driving connection between said lever and the other of said elements for rotating said elements relatively upon movement of said lever, a second means connecting said lever and said one element for relative inward and outward shifting and pivotal movement of said lever relatively to the axis of rotation of said one element, and means for biasing said lever inwardly, said center of mass, said first and second connecting means and said driving connection being located on different angularly related radii extending from a common point on the axis of rotation of said one element, the radius on which said first connecting means is located lying within the angle between the radii on which said driving connection and the center of mass are located, and the radius on which said second connecting means is located lying outside of said angle.

9. An angular phase shifting drive coupling mechanism comprising a coupling member for transmitting rotation to a driven member, a second coupling member for transmitting rotation from a driving member to said first coupling member, a centrifugal elongated weighted lever member located transversely of the axis of rotation of said members and having a center of mass, means operatively connecting said lever member at a work point to one of said coupling members for rotational movement of the latter by the former, a pair of fulcrum means floatingly connecting said lever member to the other of said coupling members, said lever member being adapted to move outwardly a limited distance at each fulcrum means when centrifugal force is applied thereto, said center of mass, said work point and said fulcrum means being located on different angularly related radii, said center of mass radius and said work point radius defining an angle within which is one only of the said fulcrum means radii, and means biasing said lever member to an innermost position at said fulcrum means, said biasing means being adapted to be overcome by different centrifugal force values.

10. An angular phase shifting drive coupling mechanism comprising, a rotatable driving member, a rotatable driven member coaxial with said drive member, a lever having a center of mass, a motion transmitting connection between said lever and one of said members, means supporting said lever on the other of said members for inward and outward sliding movement relative to the rotational axis of said members and pivoting movement about two spaced apart points, said spaced apart points, said center of mass and said connection being located on different angularly related radii extending from a point on the axis of rotation of said other member, one radius only on which one of said pivot points is located lying within the angle between the radii on which said center of mass and said connection are located, and biasing means for urging said lever inwardly, said biasing means acting to cause said lever to pivot about one of said points to impart up to a maximum relative rotation of said drive and driven members in response to the centrifugal force exerted on said lever within one speed range, and to pivot about the other point in response to the centrifugal force exerted on said lever within a higher speed range to decrease the relative rotation of said drive and driven members to less than said maximum.

11. An angular phase shifting drive coupling mechanism comprising a rotatable drive element, a rotatable driven element, a centrifugal weight member having a center of mass, a pair of shiftable fulcrum means supporting said weight member on said other element for relative inward and outward shifting and pivotal movement relative to the axis of rotation of said other element, a driving connection between said weight member and one of said elements for rotating said elements relatively upon pivotal movement of said weight member, said fulcrum means, said center of mass and said rotary connecting means being located on different angularly related radii, one of said fulcrum means radii being positioned within an angle between said center of mass radius and said drive connection radius and the other fulcrum means radius being disposed outside said angle, and means for biasing said weight inwardly toward the axis of rotation of said other rotatable element.

12. An angular phase shifting drive coupling mechanism comprising a rotatable driving element, a rotatable driven element, a centrifugal weight member having a center of mass located on a radius extending from a point on the axis of rotation of said drive element, a pair of shiftable fulcrum means located on different radii extending from said point supporting said weight member on said other element for relative inward and outward shifting and pivotal movement relative to the axis of rotation of said other element, a driving connection between said weight member and one of said elements located on another radius, the radius on which one of said fulcrum means is located being positioned within an angle between the radii on which said center of mass and said drive connection are located and the radius on which the other fulcrum means is located being disposed outside of said angle, and spring means connecting said weight member and said other element at a point remote from said driving connection for biasing said weight inwardly toward the axis of rotation of said other element.

13. An angular phase shifting drive coupling comprising a rotatable driving element, a coaxial driven element, a centrifugal weight member having a center of mass, a drive connection between said weight member and one of said elements, a first fulcrum pin and a cooperating aperture larger than said fulcrum pin connecting said weight member to the other of said elements, a second pin carried by said other element and engageable with one end of said weight member, said fulcrum pins, said center of mass and said one end of said weight member being located on different angularly related radii extending from a common point on the axis of rotation of said one element, said first pin radius lying in the angle between the center of mass radius and the driving connection radius and the second pin radius lying outside said angle, and spring means at said first pin biasing said weight member inwardly toward the axis of rotation of said other element.

14. An angular phase shifting drive coupling comprising a rotatable driving element, a rotatable driven element, a plurality of centrifugal weights, each having a center of mass, a pair of shiftable fulcrum means supporting each weight member on one of said elements for relative inward and outward shifting and pivotal movement relative to the axis of rotation of said other element, a driving connection between each of said weights and the other of said members for rotating said elements relatively upon pivotal movement of said weights, said fulcrum means, said center of mass and said driving connection of each lever being located on different angularly related radii extending from a common point on the axis of rotation of said one element, the radius on which one of said fulcrum means is located lying within an angle between the radii on which said center of mass and said driving connection are located and the radius on which the other fulcrum means is located lying outside said angle, and means for biasing said weight members inwardly to cause them to pivot about one of their fulcrum means in one rotary speed range and about the other of their fulcrum means in another speed range to shift the angular phase relationship of said elements up to a predetermined maximum angle in a lower speed range and then reduce the angular phase relationship in a higher speed range.

15. An angular phase shifting drive coupling device comprising a rotatable driving element, a rotatable driven element, a lever movable in response to centrifugal force and having a center of mass, an operating driving connection between said lever and one of said elements for rotating said elements relatively upon movement of said lever, a pair of spaced apart shiftable fulcrum means connecting said lever to the other element, said fulcrum means, said center of mass and said driving connection being located on different angularly related radii extending from a common point on the axis of rotation of said one element, said fulcrum means radii being disposed on opposite sides of said center of mass radius and said driving connection being disposed on the opposite side of one of said fulcrum means radii from said center of mass radius, and means biasing said lever inwardly in opposition to centrifugal force.

16. An angular phase shifting drive coupling device comprising a rotatable drive element, a rotatable driven element, a lever movable in response to centrifugal force and having a center of mass, an operative driving connection between said lever and one of said elements, a pair of spaced apart shiftable fulcrum means connecting said lever to the other element, said fulcrum means, said center of mass and said driving connection being located on different angularly related radii from a common point on the axis of rotation of said one element, said fulcrum means radii both being disposed to one side of said center of mass radius, said driving connection radius being disposed between said fulcrum means radii, and means biasing said lever inwardly in opposition to centrifugal force.

LLOYD H. SCOTT.

CERTIFICATE OF CORRECTION.

Patent No. 2,393,344. January 22, 1946.

LLOYD H. SCOTT.

It is hereby certified that error appears in the printed specification of the above numbered patent requiring correction as follows: Page 3, second column, line 19, for "shorter" read --stronger--; page 8, first column, line 43, claim 2, for "pivoted" read --connected--; line 45, after the word "one" strike out "side"; line 59, after "lever" insert --member--; and that the said Letters Patent should be read with this correction therein that the same may conform to the record of the case in the Patent Office.

Signed and sealed this 16th day of April, A. D. 1946.

Leslie Frazer (Seal)           First Assistant Commissioner of Patents.